United States Patent

[11] 3,615,987

[72] Inventors: Karl Blatz, Steinheim am Main; Otto Schmitt, Niedergrundau, both of Germany
[21] Appl. No.: 738,480
[22] Filed: June 20, 1968
[45] Patented: Oct. 26, 1971
[73] Assignee: Dunlop Holdings Limited, London, England
[32] Priority: June 23, 1967
[33] Germany
[31] D 53 418

[54] METHOD FOR MANUFACTURING ANNULAR SEAMLESS RUBBER OR RUBBERLIKE COMPONENTS FOR USE IN THE MANUFACTURE OF PNEUMATIC TIRES
6 Claims, 3 Drawing Figs.

[52] U.S. Cl. .................................. 156/133, 156/244
[51] Int. Cl. .................................. B29h 17/20
[50] Field of Search ..................... 156/133, 394, 114; 18/12–14, 30

[56] References Cited
UNITED STATES PATENTS

| | | | |
|---|---|---|---|
| 1,374,584 | 4/1921 | Knecht | 18/14 A |
| 1,519,522 | 12/1924 | Weigel | 18/13 M |
| 1,558,018 | 10/1925 | Lambert | 18/13 H |
| 2,710,425 | 6/1955 | Rhodes | 156/394 |

Primary Examiner—Samuel Feinberg
Assistant Examiner—R. E. Hart
Attorney—Stevens, Davis, Miller & Mosher ABSTRACT: A method of manufacturing an annular seamless component of rubber or plastics material for use in for example pneumatic tires comprising extruding a tube of said material, cutting the extruded tube in the length, and positioning the said lengths onto a building former of which the following is a specification.

INVENTORS
KARL BLATZ
OTTO SCHMITT

METHOD FOR MANUFACTURING ANNULAR SEAMLESS RUBBER OR RUBBERLIKE COMPONENTS FOR USE IN THE MANUFACTURE OF PNEUMATIC TIRES

This invention relates to the manufacture of pneumatic tires or other rubber-reinforced articles.

Pneumatic tire components hitherto known have generally been applied to a tire-building former in rubber or rubberized sheet form, this method entailing wrapping the sheet component around the former or around a sheet already mounted on the former, and overlapping the ends of said sheet to produce an annulus with generally axially extending seams. Such seams are generally disadvantageous in that the discontinuity in the now annular component produces weak spots which are more susceptible to failure than other regions of the component during use of the completed tire. In order to reduce the aforesaid difficulty, a substantial region of overlap is necessary to establish a satisfactory union between the rubber at the ends of the said sheet. However, such a situation leads to an asymmetrical construction causing unbalance in the completed tire.

It is an object of the invention to reduce or substantially eliminate the aforementioned difficulties.

According to the present invention there is provided a method of manufacturing an annular seamless component of rubber or plastics material comprising the steps of extruding a tube of said material, cutting the extruded tube into predetermined lengths and positioning said lengths onto a building former.

Reinforcement filaments, cords or wires may be embedded in the tube during extrusion.

The said reinforcement may be disposed longitudinally of the tube, so that the reinforcement extends radially in the finished tire.

In addition, the tube may be twisted after emergence from the extrusion head, so that the said reinforcement becomes inclined to the longitudinal axis of the tube. Alternatively, the tube lengths may be twisted after the extruded tube has been cut, to yield substantially the same result, in either case the reinforcement extends at a bias angle in the finished tire.

The method may also include the steps of extruding a tube comprising a plurality of layers of different compositions.

According to the present invention also, there is provided apparatus for manufacturing a reinforced annular seamless component of rubber or plastics material comprising an extrusion head having an annular nozzle, a plurality of inserts arranged around the periphery of the nozzle through which reinforcement filaments, cords or wires can be fed to become embedded in the said material, a core disposed within the said nozzle, and means for cutting the extruded tube into predetermined lengths, and a building former on which said component is positioned.

The apparatus may comprise ceramic inserts arranged on the nozzle in circumferentially spaced-apart relationship and along a plurality of peripheral circles.

Embodiments of the invention will now be described with reference to the accompanying drawings wherein.

Figure 2:
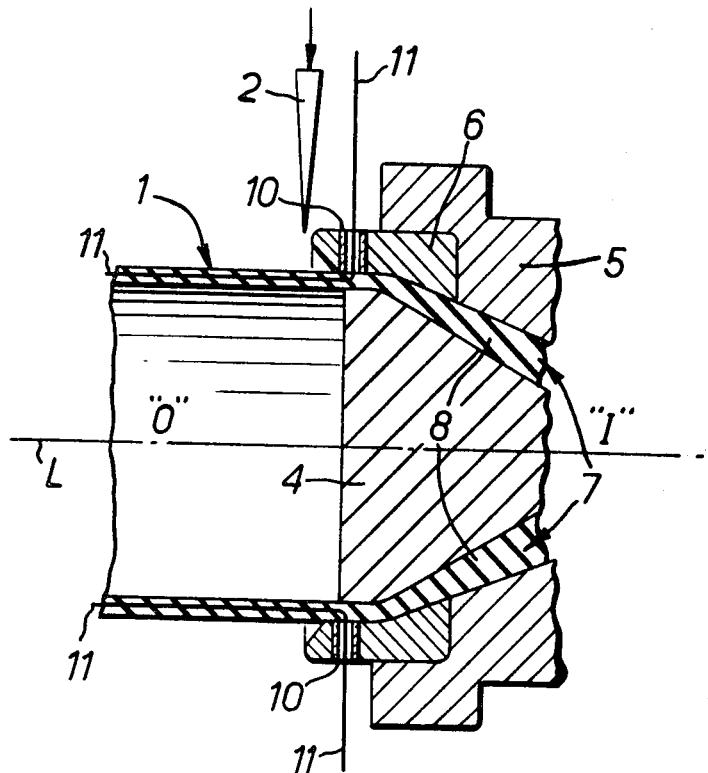
FIG. 2 illustrates a side cross-sectional view of an extrusion head according to a first or second embodiment of the invention.
Figure 1:
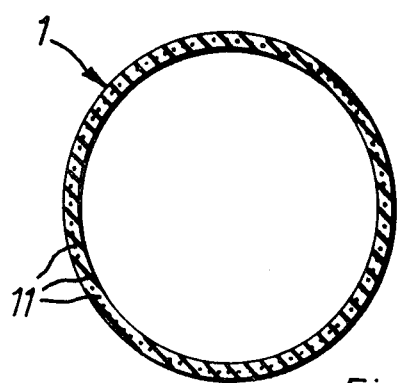
FIG. 1 illustrates an axial cross-sectional view of a carcass reinforcement layer for a pneumatic tire manufactured according to a first embodiment of the invention.
Figure 3:
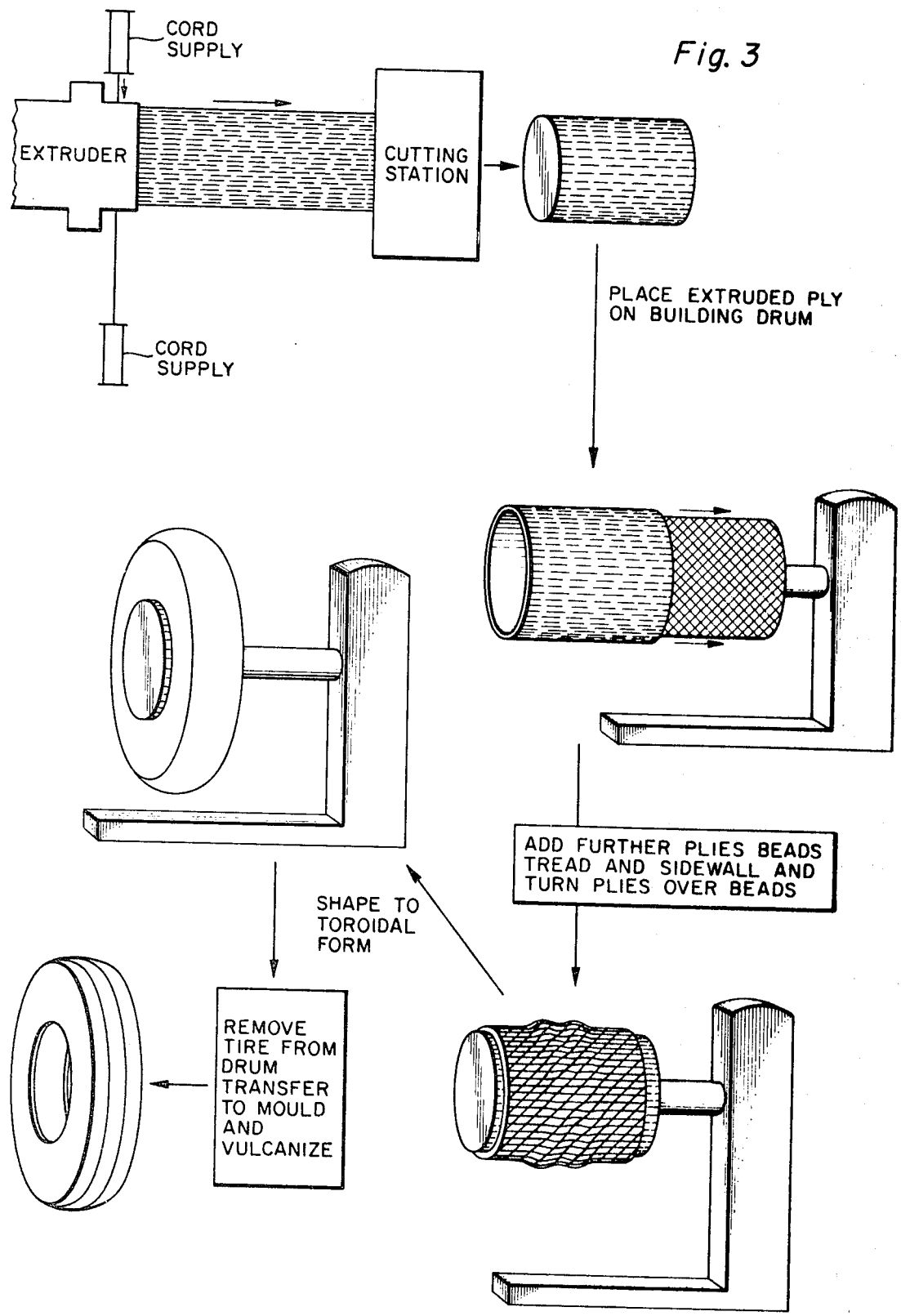

In a first embodiment according to the invention, an apparatus, shown in FIG. 2, is provided for manufacturing an annular seamless rubber carcass reinforcement 1, shown in FIG. 1, for a pneumatic tire, and comprises an extrusion head 5, and a nozzle 6 mounted partly within the outlet O of the extrusion head, a portion thereof protruding from the outlet end O of the extrusion head. The interior surfaces of the nozzle 6 and the extrusion head 5 together form a smooth frustoconical surface which diverges in the direction of flow of the material 8 being extruded, being of maximum diameter at a region adjacent to the outlet portion of the nozzle. A core 4 is disposed within the outlet portion of the extrusion head 5 and nozzle 6 and is axially movable therein, the means for effecting axial movement not being shown. The core 4 is of conical form, the apex of the core being disposed axially inwardly of the outlet end of the nozzle 6 and extrusion head 5, and the core 4 being disposed symmetrically about the longitudinal axis L of the frustoconical surface of the interior of the extrusion head 5 and nozzle 6. The degree of divergence of the conical surface is greater than that of the frustoconical surface so that the material 8 being extruded is offered a gradually narrowing area 7 to traverse, causing gradual consolidation of the said material 8. The outlet portion O of both core 4 and nozzle 6 level off so that the radial spacing between the core 4 and the nozzle 6 over a small region adjacent the outlet portion of the core 4 and nozzle 6 is constant, and so that the surfaces of said portions are disposed parallel to the longitudinal axis L of the extrusion head 5, nozzle 6 and core 4.

A plurality of substantially radially extending ceramic inserts 10 is arranged on the periphery of that portion of the nozzle 6 protruding axially outwardly of the extrusion head 5 and communicate with the passage between the core 4 and nozzle 6. The said ceramic inserts 10 serve as inlets for the reinforcement cords 11 and by means of said arrangement of the ceramic inserts 10 the density of the filaments per unit area of extruded tube may be regulated.

The apparatus also comprises cutting means 2 and a tire-building former (not shown), for forming the said annular carcass, when applied, into the toroidal form of the carcass in the completed tire.

In a modification of the aforementioned embodiment (not shown) the extrusion head is provided with a series of concentric pipes at the inlet end I thereof and extending into the extrusion head 5. Such an arrangement permits extrusion of a composite tube comprising several layers extruded simultaneously.

The operation of the apparatus of the first embodiment of the invention will now be described.

The core 4 is prearranged within the nozzle 6 and extrusion head 5 before extrusion takes place in such a manner as to define the dimensions of the extruded tube 1.

Reinforcement cords 11 are fed into the rubber composition 8 being extruded via ceramic inlets 10 mounted on the nozzle 6, the adhesion between the reinforcement cords and the said rubber composition 8, and also the momentum of the said rubber composition 8 causing the reinforcement cords 11 to be drawn into the tube 1 being extruded.

Such an operation will produce a tube with substantially longitudinally extending reinforcements 11 although the accurate disposition of the reinforcement 11 being dependent upon maintaining an even flow in the said material 8 during extrusion.

The tube is cut into lengths of the desired dimension, and is now in a condition for mounting upon a tire-building former.

The carcass in its present cylindrical condition is applied to the tire-building former, on which it is formed into the toroidal shape of the carcass in the completed tire.

Several cylindrical carcass layers are applied to the tire building former, to which the beads, the tread and the sidewalls are applied and the whole shaped into the toroidal condition of the completed tire.

In a modification of the above-mentioned operation, the carcass reinforcement layers are prepared as a single component with the concentric reinforcement layers embedded therein.

In a second modification of the aforesaid operation, the position of the core 4 with respect to the nozzle 6 and extrusion head 5 is not fixed during extrusion but is varied axially with respect to the extrusion head 5 so that a tube of varying wall thickness, or varying diameter may be extruded.

In a third modification of the aforesaid operation of the apparatus of a first embodiment of the invention, the extruded tube 1 is twisted as it emerges from the extrusion head to produce a tube with the reinforcement cords substantially inclined to an imaginary line drawn on the surface of the tube parallel to the longitudinal axis L of the tube, the cords describing a helix about the longitudinal axis L of said tube.

In a second embodiment according to the invention, an apparatus similar to that described in the first embodiment is used to manufacture annular seamless rubber sidewall components for use in the manufacture of a pneumatic tire.

In this case, no reinforcement is fed into the extruded rubber tube. In all other respects, the operation of the apparatus is similar to that described in the first embodiment.

The cylindrical sidewall rubber components, when manufactured, are positioned onto a carcass reinforcement provided with bead wires and located on a tire-building former, and after application of a tread rubber, is in a condition ready for shaping into the toroidal form of the completed tire.

Having now described my invention, what we claim is:

1. A method of manufacturing an annular seamless component of rubbery material comprising the steps of extruding a tube of said material, embedding reinforcement cords in the tube disposed generally longitudinally of the tube during the extrusion, cutting the reinforced extruded tube into predetermined lengths and positioning said predetermined lengths onto a building former.

2. A method according to claim 1 wherein the tube is twisted after emergence from the extrusion head and before cutting.

3. A method according to claim 1 wherein the tube lengths are twisted after the extruded tube has been cut.

4. A method according to claim 1 wherein a plurality of layers of rubbery material, each of different composition is extruded to form a composite tube comprising concentric layers.

5. A method according to claim 1 wherein a carcass reinforcement for a pneumatic tire is manufactured as an annular seamless component and positioned on a tire-building former.

6. A method according to claim 1 wherein a sidewall component for a pneumatic tire is manufactured as an annular seamless component and positioned on a tire-building former.